Feb. 19, 1946. W. J. SPARKS ET AL 2,395,079
APPARATUS FOR THE MANUFACTURE OF POLYMER
Filed Sept. 6, 1941   2 Sheets-Sheet 2

William J. Sparks
Donald C. Field  Inventors
By J. Small  Attorney

Patented Feb. 19, 1946

2,395,079

UNITED STATES PATENT OFFICE 2,395,079

APPARATUS FOR THE MANUFACTURE OF POLYMER

William J. Sparks, Elizabeth, and Donald C. Field, Linden, N. J., assignors, by mesne assignments, to Jasco, Incorporated, a corporation of Louisiana Application September 6, 1941, Serial No. 409,909

4 Claims. (Cl. 23—285)

This invention relates to polymerization processes and apparatus; and relates particularly to a reaction vessel for low temperature polymerization reactions.

It has been found that various ones of the olefins, diolefins and olefinic mixtures, when cooled to low temperatures ranging from 0° C. to —100° C. or even lower, to —165° C. preferably below —10° C. or —40° C., and treated with an active halide catalyst, will polymerize into very high molecular weight substances having molecular weights ranging from 1000 to 20,000 or more up to 250,000 or 350,000 or even higher to 500,000. This polymerizing reaction has been applied to simple olefins such as isobutylene, or to simple diolefins such as butadiene or to mixtures of isobutylene with a diluent or diluent-refrigerant such as ethylene, or propane, or methane, or ethyl or methyl chlorides and the like. In this polymerization reaction boron trifluoride is usually used as the polymerization catalyst. Also, it has been found possible to polymerize mixtures of olefins and mixtures of olefins and polyolefins particularly isobutylene and diolefins such as butadiene, isoprene, pentadiene, dimethylbutadiene, and the like, by the application thereto of various forms of active halide catalysts such as Friedel-Crafts type catalysts of the type of boron trifluoride, or solutions of such catalysts as boron trifluoride, aluminum chloride, aluminum bromide, titanium tetrachloride, uranium tetrachloride and the like, dissolved in low freezing solvents such as ethyl chloride, methyl chloride, carbon disulfide and the like.

These reactions are, however, delicate ones which are easily interfered with. In order to obtain maximum molecular weights, or the desired molecular weights, it is essential that the reactions occur under the most favorable conditions, particularly with respect to maintenance of the low temperature, suitable contacting of the materials entering the vessel, freedom from undesired impurities, turbulent reaction surfaces, maintenance of the solid polymers in fine particle size, and a minimum of polymerization on or adhesion of products to the walls of the reaction vessel.

Also, it is desirable that the catalyst be quenched by the use of a quenching agent such as alcohol or other oxygenated organic substances, or acid, ar alkali, or water or other appropriate catalyst quenching agent, at the proper time, and it is imperative that the contents of the reaction vessel be readily and conveniently discharged from the reaction vessel with a minimum of contamination and with a minimum of opportunity for the entrance of undesired substances into the reaction vessel.

The present invention provides a reaction vessel, suitable for low temperature reactions generally, which is equipped with a cooling jacket; equipped with means for the delivery thereto of diluents, refrigerants, the necessary reactants and quenching agents; equipped with stirring members adapted to obtain turbulent liquid surfaces and to reduce to a minimum the agglomeration of solid polymer into large masses and the adhesion of polymer to the walls of the reaction chamber; equipped with a controllable catalyst spray member; equipped with a discharge port and port cleaner, and equipped with inspection ports by which the progress of the reaction can be observed, while maintaining a tight seal to prevent loss of volatilization products from the reaction mixture except through vents provided for the conducting away of such volatilization products.

By the device of the invention, the reactants are mixed in a cooled reaction chamber, and a homogeneous mixture obtained by turbulent submerged agitation; the catalyst is delivered to the reactant mixture, preferably in the form of a fine spray, during a rapid turbulent mixing by which the catalyst is rapidly dispersed from the surface of the reactant mix into the body thereof, while the walls of the reaction chamber are scraped to prevent the adhesion of polymer or the production of adherent, undesirably low molecular weight polymer upon the upper walls of the reaction chamber. When the polymerization reaction has reached the desired stage, the catalyst quenching material is added to the mixture and stirred rapidly thereinto, or the polymerization mixture is discharged through an outlet port and contacted with a body of catalyst quenching material, all while maintaining rapid and efficient turbulent agitation of the mixture; any agglomerated solid polymer being forced through the discharge port by a plunger, and the reaction chamber cleared of material, especially material containing undue quantities of catalyst which otherwise tends to polymerize and adhere to the upper walls of the reactor; all the while recovering volatilized material resulting from the heat of reaction, for reuse after purification. Other objects and details of the invention will be apparent from the following description when read in connection with the accompanying drawings, wherein:

Figure 1:
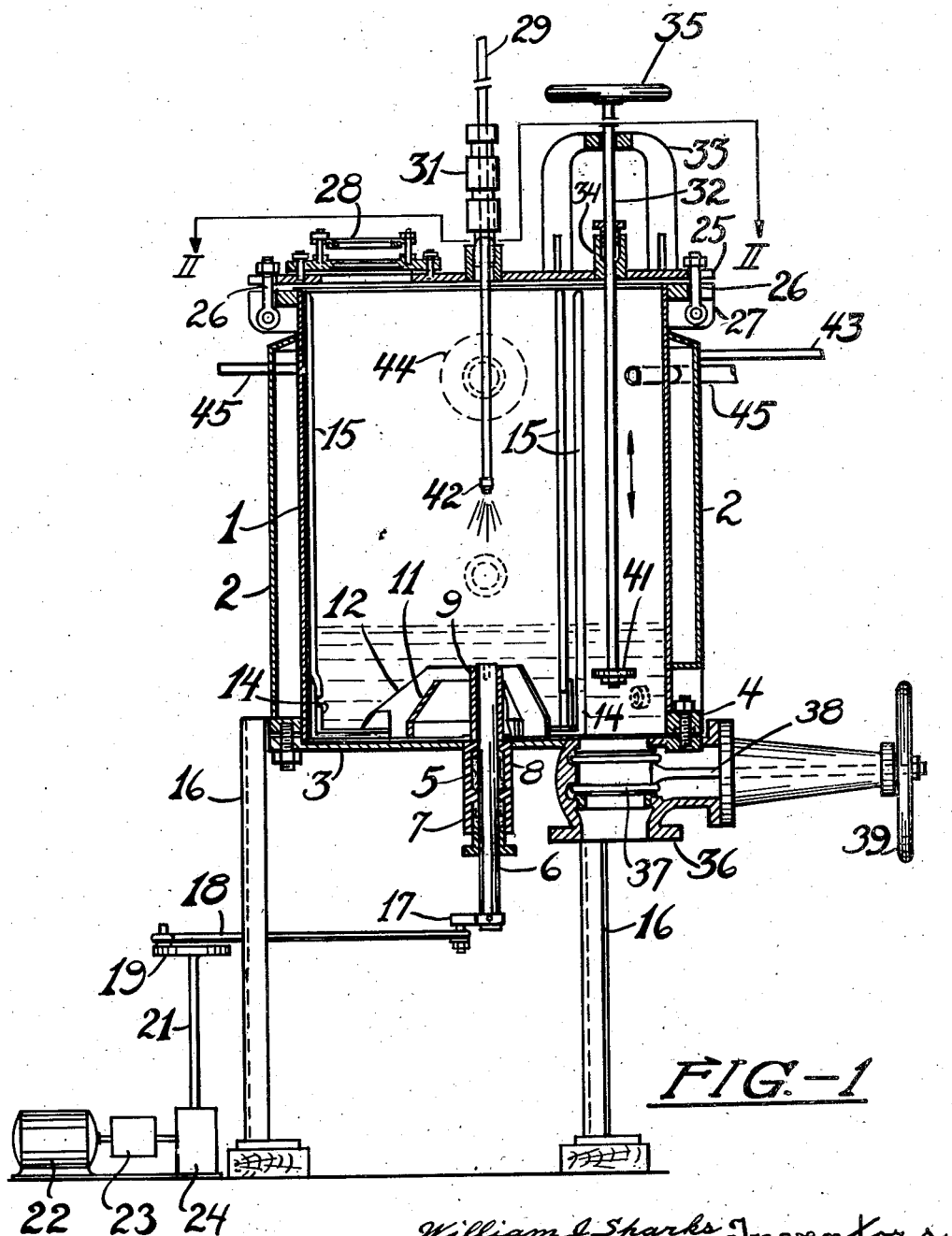
Fig. 1 is a side view in section of the polymerization vessel of the reaction.
Figure 2:
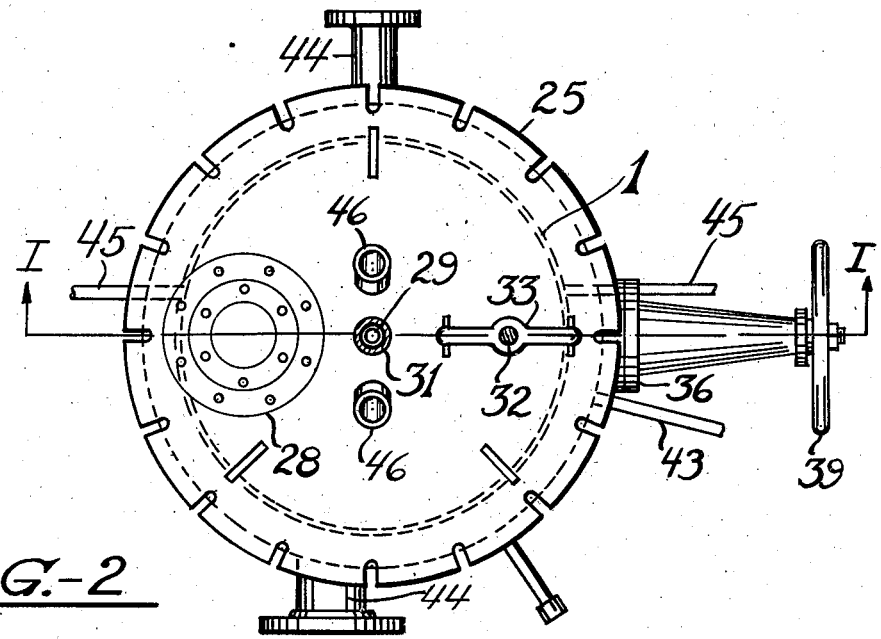
Fig. 2 is a top view of the reaction chamber of the invention along the lines II, II of Fig. 1.
Figures 3, 4:
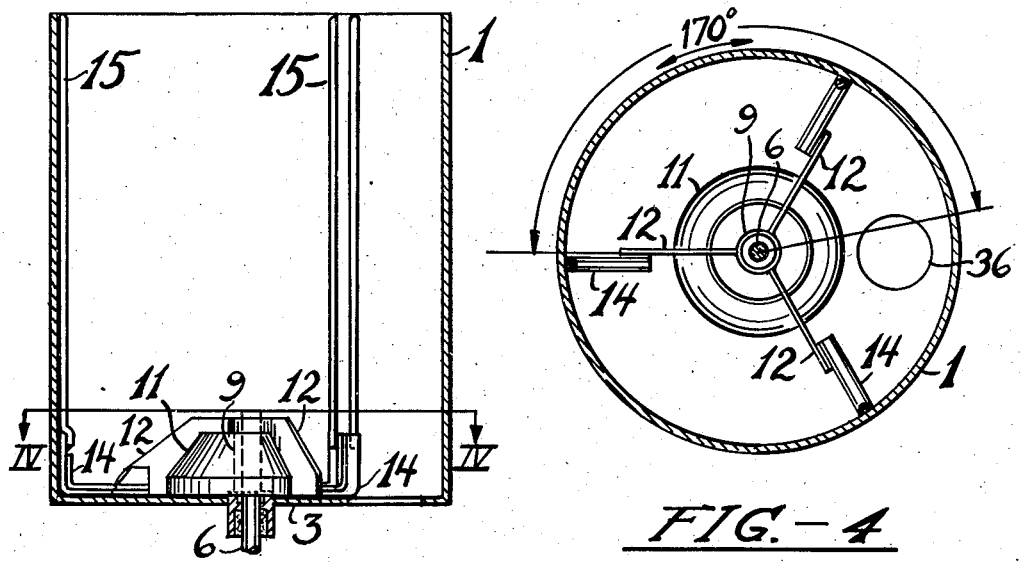
Fig. 3 is a side view in section of the reaction vessel, liner and scrapers of the invention.
Fig. 4 is a top view in section along the lines IV of Fig. 3 of the invention.

Referring to the figures a main reaction vessel or liner 1, is provided surrounded with a second vessel 2 which forms a cooling jacket for the vessel 1 and contains a suitable coolant which may be the same as the internal coolant mixed with the reactants within the chamber 1. The cooling jacket 2 is preferably further jacketed by a covering of heat insulating material (not shown), such as asbestos fiber, cotton wool, ground cork or other suitable material for restricting and reducing the flow of external heat into the cooling jacket. A bottom member 3 is provided and preferably bolted to a flange 4 attached to the reaction chamber member 1. At the center of the bottom member 3 there is provided a sleeve member 5 through which a shaft member 6 is passed. Packing glands 7 and 8 are provided to minimize the leakage of material along the shaft. An inner sleeve member 9 is provided, attached to the shaft 6, and a bell member 11 is attached to the sleeve 9. On the top of the bell member 11 there are provided stirring vanes or fins 12 to which are attached extension members 14 having scraper members 15 attached thereto. As shown, the scraper members 15 extend substantially to the top of the reaction vessel 1, and the members 14 and 12 together act as scrapers for the bottom of the reaction chamber, as well as serving as stirring members. The reaction vessel is supported upon legs 16, preferably three or four in number, for convenience in leveling the reaction vessel. The shaft 6 is driven by a crank member 17, a connecting rod 18 and a crank 19 mounted upon a shaft 21 which in turn is driven by a motor 22 through a speed control unit 23 and gear reduction unit 24. This gear is constructed and proportioned in such a manner that shaft 6 is not rotated, but is oscillated through any desired angular displacement, for example 125° or more e. g. 125° or more if 3 scrapers, or 95° or more if 4 scrapers are used.

The top of the reaction vessel is closed by a cover member 25 held in place by bolt members 26 which are mounted in a flange 27 attached to the reaction chamber 1. The cover 25 is equipped with one or more sight openings 28, each consisting of a glass member held in place by a bolted frame and made vapor tight by packing members.

A catalyst spray tube 29 is provided which passes with a sliding fit through a packing gland 31. A discharge port clearing rod member 32 is also provided supported by a suitable frame 33 and passing through another packing gland 34. The rod 32 is equipped with a hand wheel 35 by which it can be rotated and moved up and down. The reaction vessel 1 is equipped with a discharge port in the form of a valve 36 (which may be either a gate valve, or a plug type valve) which has a gate member 37 operated by a threaded rod 38 and hand wheel 39. The port clearing rod 32 is axially in line with the axis of the valve 36 forming the discharge port, and a plunger member 41 is attached to the lower end of the clearing rod 32, and adapted to enter the bore of the valve 36. The catalyst delivery tube 29 is equipped at the lower end with a spray head 42.

The cooling jacket 2 is equipped with an inlet pipe 43 which is connected to a supply of the liquid coolant, and is equipped with an outlet pipe 44 which is connected to a gas storage member and in turn to purification and condensing equipment for reuse of the refrigerant. Supply pipe lines 45 for the delivery to the reaction chamber of the necessary reactants are also provided. Auxiliary catalyst supply ports 46 are also provided through which the catalyst may be delivered either as a gas, a fine stream or as a spray.

In the operation of the device of the invention, the refrigerant, which preferably is liquid propane or liquid ethane or liquid ethylene, is delivered to the cooling jacket 2 through the supply pipe 43 and the vapors from the volatilized refrigerant are discharged through the outlet 44 until the reaction chamber is cooled to the boiling temperature, (under approximately atmospheric pressure) of the refrigerant used. When this temperature is reached, a substantial quantity of liquid refrigerant is built up in the jacket to maintain the desired low temperature. The reactants are then brought into the reaction vessel proper. These reactants preferably consist of an isoolefin such as isobutylene, or a mixture of an olefin and a diolefin, such as isobutylene with a diolefin such as butadiene or isoprene or pentadiene or dimethylbutadiene; and the reaction mixture preferably contains also a substantial proportion of refrigerant-diluent which desirably is the same as the material in the cooling jacket if the latter is propane or ethane or ethylene or the like. These components of the reaction mixture are delivered to the reaction vessel through the supply pipes 45 and the motor 26 is desirably put into operation at the time the delivery is begun, in order to actuate the agitating members as shown, and maintain a thorough and intimate mixture of all of the reaction substances. When the desired quantity of the various components of the reaction mixture has been delivered through the supply pipes 45, the catalyst is delivered to the tube 29, and to the rapidly stirred and turbulently agitated reaction mixture by the tube 29.

It will be observed that the submerged turbulent agitation necessary to incorporate the catalyst solution rapidly into the reaction mixture may produce a great deal of splashing and some of the reactant mix may be splashed upward on to the sides of the reaction vessel in the presence of catalyst, and in consequence, polymerization may occur upon the walls of the reaction chamber, which, when it occurs, tends to build up a thick layer of solid polymer. This is removed and returned to the reaction mix by the scrapers 15, which thereby prevent the occurrence of an undue amount of polymerization under undesirable polymerization conditions.

It is usually undesirable to carry the polymerization reaction to the stage where all of the reactants present are polymerized, but instead it is usually desirable that the reaction be halted when from 40% to 85 or 95% of the reactive materials in the reaction mix have been polymerized into the desired solid polymer. For this purpose, the catalyst supply may be interrupted and a quantity of catalyst quenching agent such as isopropyl alcohol or other convenient oxygenated or alkaline material may be added to the reaction chamber either by way of the supply pipe 45, or by way of an auxiliary supply pipe. The continued rapid stirring mixes the quenching material quickly into the reactants and produces the desired halt of the polymerization reaction.

Alternatively, the valve 37 may be opened, and the reaction mixture discharged through the valve 36 into a container in which there has previously been placed an appropriate quantity of catalyst quenching agent. The solid polymer is then removed from the reaction mix, brought up to room temperature, and given such further processing treatment as is desired, or as is appropriate, including such steps as washing, compounding with other substances and other steps preparatory to utilization.

The device above described when operated, as outlined, is particularly adapted to the polymerization of liquid substances in which the polymer is produced in a solid phase. It is particularly adapted to controlled temperature operation, either at low temperature or at high temperature. It is particularly adapted for conducting reactions in which either a catalyst or a reactant member disperses rapidly into the reaction mixture; with a minimum of reaction away from the liquid body such as on the walls of the container. That is, the device provides a maximum of turbulent agitation with a minimum of splashing onto the walls, and a minimum of reaction on the walls above the surface level.

The device is particularly adapted to the low temperature polymerization of unsaturates such as butadiene.

Example 1

A mixture was prepared consisting of 2000 parts of liquid ethylene, and 1000 parts of liquid butadiene. This mixture was placed in the device as above described, and a catalyst solution consisting of 300 parts of methyl chloride and 1.8 parts of aluminum chloride was added through the tube 29 during rapid agitation of the mixed ethylene and butadiene. The butadiene polymerized in the form of a slurry of the solid polybutadiene in suspension in the rapidly stirred liquid ethylene. The reaction was quenched as above described. The solid polymer was then separated from the liquid ethylene and brought up to room temperature to yield a finely powdered resin, showing the characteristics of thermo-plasticity, a relatively high iodine number and compatibility with a considerable number of other resins in which it serves as a modifying agent.

Example 2

The device of the invention is also advantageous for the production of polyisobutylene. For this purpose a mixture of 2000 parts of liquid ethylene with 1000 parts of liquid isobutylene was placed in the reactant as above described, the stirring members set into operation, and a stream of boron trifluoride was bubbled through the liquid from the tube 29 with the end of tube 29 submerged in the stirred liquid. Polymerization occurred rapidly to yield a high molecular weight polyisobutylene, which was particularly advantageous for many uses such as compounding with rubber for electrical insulation and compounding with paraffin for the preparation of waterproofing materials, and the like.

Example 3

It is not necessary that a gaseous boron trifluoride catalyst be used. The same liquid catalyst as in Example 1 may be used.

A mixture of 2000 parts of liquid ethylene was prepared with 1000 parts of liquid isobutylene and placed in the reactant as above described. With the stirring members in operation a catalyst consisting of 1.8 parts of aluminum chloride dissolved in 300 parts of ethyl chloride was added through the tube 29 and the spray head 42 onto the surface of the stirred mixture. At the end of the reaction the catalyst was quenched as above described, and the solid polymer was separated from the remaining liquid. This procedure yields a particularly high molecular weight polymer which may be of the order of 350,000 to 600,000 or higher.

The above described embodiment provides a particularly advantageous form of turbulent agitation, which is an essential feature of the present invention, to obtain the necessary rapid incorporation of the catalyst into the reaction mixture. This particular agitator, is not, however, the only satisfactory embodiment of the invention. An alternative embodiment is found in a system consisting of rapidly revolving stirring members of the centrifugal pump or propeller blade type. In this embodiment preferably two concentric shafts are provided extending upward through the bottom of the reactor vessel, with means for driving the shafts in opposite directions at relatively high rates of speed. Upon the respective shafts (that is, a solid shaft and a concentric tube with packing means to prevent the leakage of liquid around either shaft) there are attached two propellers or agitators. These are preferably right-hand and left-hand propeller devices, rotated in opposite directions by the respective shafts. This system provides a very powerful turbulent agitation of the reaction mixture and is as satisfactory as the embodiment previously disclosed.

Similarly, the rotary members may be simply blades parallel to the axis of the shafts.

With either of these agitating means, it is desirable that a scraper device be provided in combination therewith for clearing the walls of the reactor vessel. This scraper may be simply a single blade rotating over the inner wall at a relatively low rate of speed, or it may be one or more reciprocatory members of the type shown in the first described embodiment.

By the device of the invention, there is thus provided a reaction chamber comprising a container, a cooling jacket, stirring means and scrapers for providing turbulent agitation of the reactants while preventing reaction upon the side walls above the liquid level, means for delivering a spray of catalyst solution to the reactant mix, means for the delivery of reactants to the reaction vessel at low temperature, means for the recovery of volatilized reactants, means for quenching reaction at the desired stage, means for watching the progress of the reaction, and means for discharging the polymer and residual reaction mixture into a receiver or into a quenching mixture.

While there is above disclosed but a single embodiment of the device of the invention, it is possible to produce still other embodiments of the invention without departing from the inventive concept herein disclosed and it is therefore desired that only such limitations be imposed upon the appended claims as are stated therein or required by the prior art.

The invention claimed is:

1. A polymerization reactor comprising in combination a reaction vessel, a vertical shaft therein, a plurality of paddles attached to said shaft, means for oscillating said shaft and paddles to provide submerged turbulent agitation of liquid within said reactor, scraper members cooperating with the side walls of the said reaction vessel and actuated by the oscillation of said shaft, a sealing cover closing the top of said reaction vessel, a packing gland attached to said cover, a tube adjustably passing through said sealing gland having a spray means at the lower end thereof, within the said reaction vessel, supply means for catalyst solution connected to said tube; a valved discharge outlet at the bottom of said reaction vessel, a second packing gland in said cover, a rod passing through said second packing gland, said packing gland and rod being in axial coincidence with said discharge outlet, and a disc member on the end of said rod adapted to enter said discharge outlet for clearing solids therefrom.

2. A polymerization reactor comprising in combination a reaction vessel, a vertical shaft therein, a plurality of paddles attached to said shaft, means for oscillating said shaft and paddles to provide submerged turbulent agitation of liquid within said reactor, scraper members cooperating with the side walls of the said reaction vessel and actuated by the oscillation of said shaft, a refrigerating jacket around said reactor, and means for the supply thereto of refrigerant, a sealing cover closing the top of said reaction vessel, a packing gland attached to said cover, a tube adjustably passing through said sealing gland having a spray means at the lower end thereof, within the said reaction vessel, supply means for catalyst solution connected to said tube; a valved discharge outlet at the bottom of said reaction vessel, a second packing gland in said cover, a rod passing through said second packing gland, said packing gland and rod being in axial coincidence with said discharge outlet, and a disc member on the end of said rod adapted to enter said discharge outlet for clearing solids therefrom.

3. A polymerization reactor comprising in combination a reaction vessel, a vertical shaft therein, a plurality of paddles attached to said shaft, means for oscillating said shaft and paddles to provide submerged turbulent agitation of liquid within said reactor, scraper members cooperating with the side walls of the said reaction vessel and actuated by the oscillation of said shaft, the number of said scraper rods being adjusted according to the arc of oscillation of the said shaft, such that the arc of oscillation of adjacent scraper members at least meet, a sealing cover closing the top of said reaction vessel, a packing gland attached to said cover, a tube adjustably passing through said sealing gland having a spray means at the lower end thereof, within the said reaction vessel, supply means for catalyst solution connected to said tube; a valved discharge outlet at the bottom of said reaction vessel, a second packing gland in said cover, a rod passing through said second packing gland, said packing gland and rod being in axial coincidence with said discharge outlet, and a disc member on the end of said rod adapted to enter said discharge outlet for clearing solids therefrom.

4. A polymerization reactor comprising in combination a cylindrical reaction vessel, a refrigerating jacket therearound, a bottom member having in the center thereof a packing gland, a vertical shaft entering through said packing gland, a plurality of stirrer members attached to said vertical shaft suitable for producing submerged turbulent agitation in liquid in said reactor, a plurality of scrapers cooperating with the cylindrical side wall of said reactor and attached to said vertical shaft, means for oscillating said vertical shaft through an arc of such size that the paths of travel of the said scraper members over the reactor wells at least meet, a cover member for said reactor, a packing gland in said cover, a tube passing through said packing gland, a spray head on the end of said tube, within said reactor, means for the supply of catalyst under pressure to said tube, means for the discharge from said reactor of vaporized liquid, the bottom of said reactor also being equipped with a discharge outlet comprising a gate valve, the cover on said reactor having a second packing gland, and rod passing therethrough in axial alignment with said valved discharge opening, the said rod having a disc at the lower end thereof adapted to enter the discharge opening and clear solids therefrom, the top of said rod having a grip means suitable for moving the said rod up and down and rotating it.

WILLIAM J. SPARKS.
DONALD C. FIELD.